(12) United States Patent
Straitiff

(10) Patent No.: US 8,579,381 B2
(45) Date of Patent: Nov. 12, 2013

(54) WHEEL CENTERING APPARATUS

(75) Inventor: Donald G. Straitiff, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 13/164,463

(22) Filed: Jun. 20, 2011

(65) Prior Publication Data

US 2012/0319460 A1 Dec. 20, 2012

(51) Int. Cl.
*B60B 3/14* (2006.01)

(52) U.S. Cl.
USPC .................. 301/35.627; 301/105.1

(58) Field of Classification Search
USPC .................. 301/9.1, 35.627, 105.1
See application file for complete search history.

(56) References Cited

U.S. PATENT DOCUMENTS

| 5,318,353 A | * | 6/1994 | Frick ........................ 301/105.1 |
| 5,692,811 A | * | 12/1997 | Rogers ....................... 301/105.1 |
| 2011/0221262 A1 | * | 9/2011 | Stuck et al. .................... 301/9.1 |

* cited by examiner

*Primary Examiner* — Kip T Kotter
*Assistant Examiner* — Jean Charleston

(57) ABSTRACT

An annular centering ring centers a wheel on a hub. The hub has a circular outer surface and an outer end face. The wheel has a central opening defined by a circular wall. The annular centering ring has an annular mounting flange structure that seats upon the circular outer surface and the outer end face of the hub, and a centering skirt structure that is engaged by the circular wall of the wheel when the wheel is installed onto the hub so that the centering skirt structure is flexed and occupies the annular space between the circular outer surface of the hub and the central opening of the wheel to thereby center the wheel upon the hub in readiness for installation of a plurality of lug nuts. The centering skirt structure is captured in a press-fit relationship between the wheel and hub, or can be extruded away during the installation of the wheel onto the hub.

18 Claims, 3 Drawing Sheets

WHEEL CENTERING APPARATUS

FIELD OF THE INVENTION

The present invention relates to a centering ring for centering a wheel on a hub.

BACKGROUND OF THE INVENTION

In motor vehicles, a wheel is mounted on a rotating hub via lug bolts and nuts. The center of the wheel traditionally has an opening that fits over the end of the hub so that the wheel is centered upon the hub in readiness for tightening of the lug nuts. Thus, the accurate centering of the wheel upon the hub will depend upon the manufacturing tolerances of the size and shape of the opening in the wheel and the manufacturing tolerances of the size and shape of the end of the hub. Because of manufacturing tolerances, it can be difficult to reliably assure that the wheel opening and the hub are precisely corresponding in size and shape so as to obtain the desired centering of the wheel upon the hub.

It would be desirable to provide improved apparatus for centering a wheel upon a hub, to thereby assure optimum ride and handling of the motor vehicle.

SUMMARY OF THE INVENTION

An annular centering ring centers a wheel on a hub. The hub has a circular outer surface and an outer end face. The wheel has a central opening defined by a circular wall. The annular centering ring has an annular mounting flange structure that seats upon the circular outer surface and the outer end face of the hub, and a centering skirt structure that is engaged by the circular wall of the wheel when the wheel is installed onto the hub. The centering skirt structure is flexed and occupies the annular space between the circular outer surface of the hub and the central opening of the wheel to thereby center the wheel upon the hub in readiness for installation of a plurality of lug nuts. The centering skirt structure is captured in a press-fit relationship between the wheel and hub, or can be extruded way during the installation of the wheel onto the hub.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
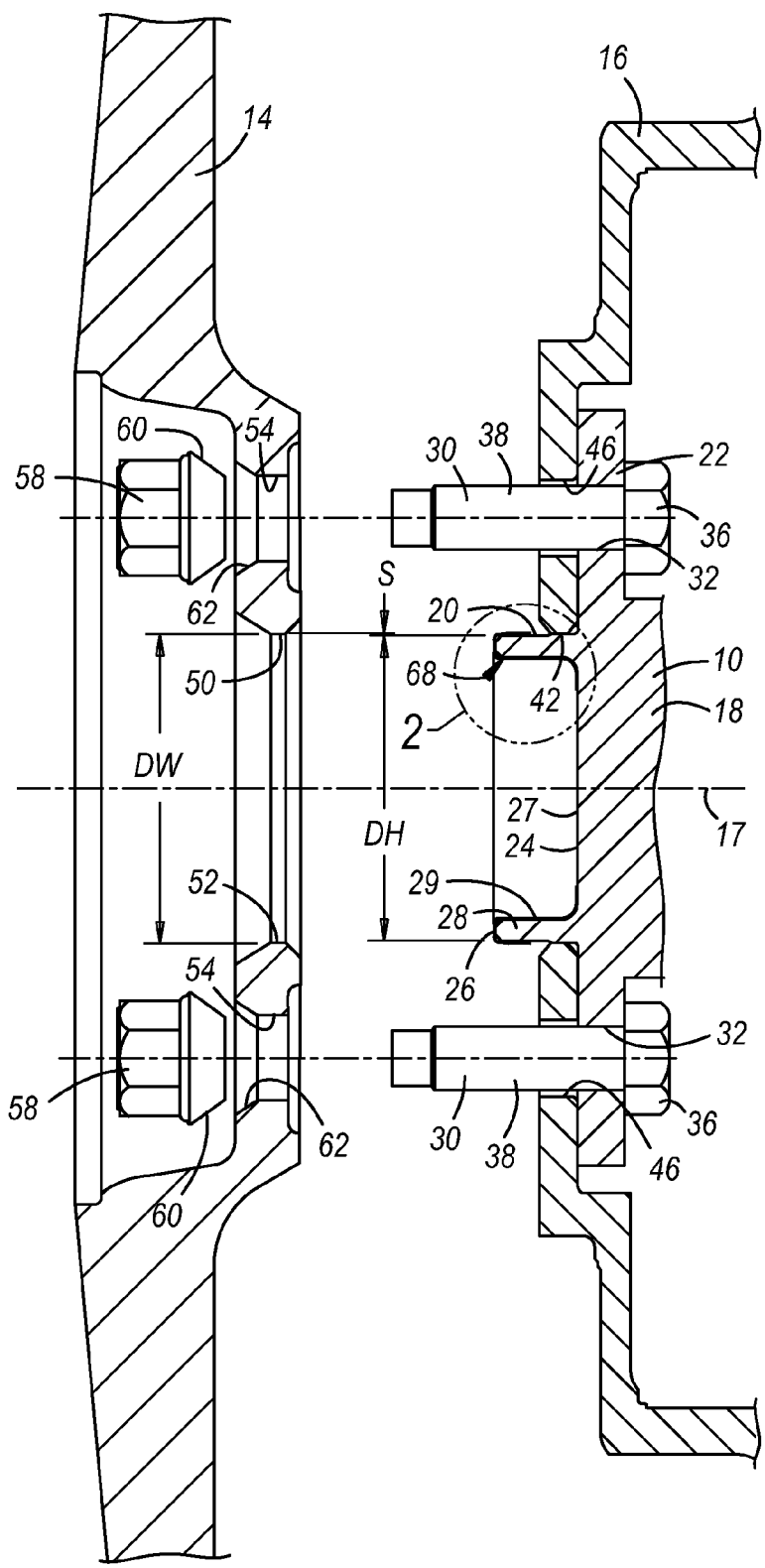
FIG. 1 shows a vehicle wheel ready to be installed on a wheel hub of a motor vehicle.

Referring to FIG. 1, a hub 10 mounts a wheel 14 and a brake rotor 16 on a motor vehicle. The hub 10 is mounted on an axle or a steering knuckle by a bearing assembly, not shown.

The hub 10 has a centerline designated 17 and includes a shaft portion 18 and a hub flange 22 that project outwardly from a circular outer surface 20 of the shaft portion 18. As seen in FIG. 1, the hub shaft 18 has an outer end face 26. A cavity 24 is provided in the outer end face 26, thereby defining an axial projecting rim structure 28. Cavity 24 has a cavity bottom wall 27 and a cavity inner side wall 29. The circular outer surface 20 has a diameter DH. The circular outer surface 20 is machined to be cylindrical in shape and of uniform outer diameter, and extends axially with no grooves or other surface features.

A plurality of lug bolts 30 extend through holes 32 provided in the hub flange 22. Each of the lug bolts 30 includes a head 36 and a threaded stud 38. The brake rotor 16 has a central opening 42 that will fit over the circular outer surface 20 of the hub 10. The brake rotor 16 also has a plurality of bolt holes 46 that fit over the threaded studs 38.

Figure 4:
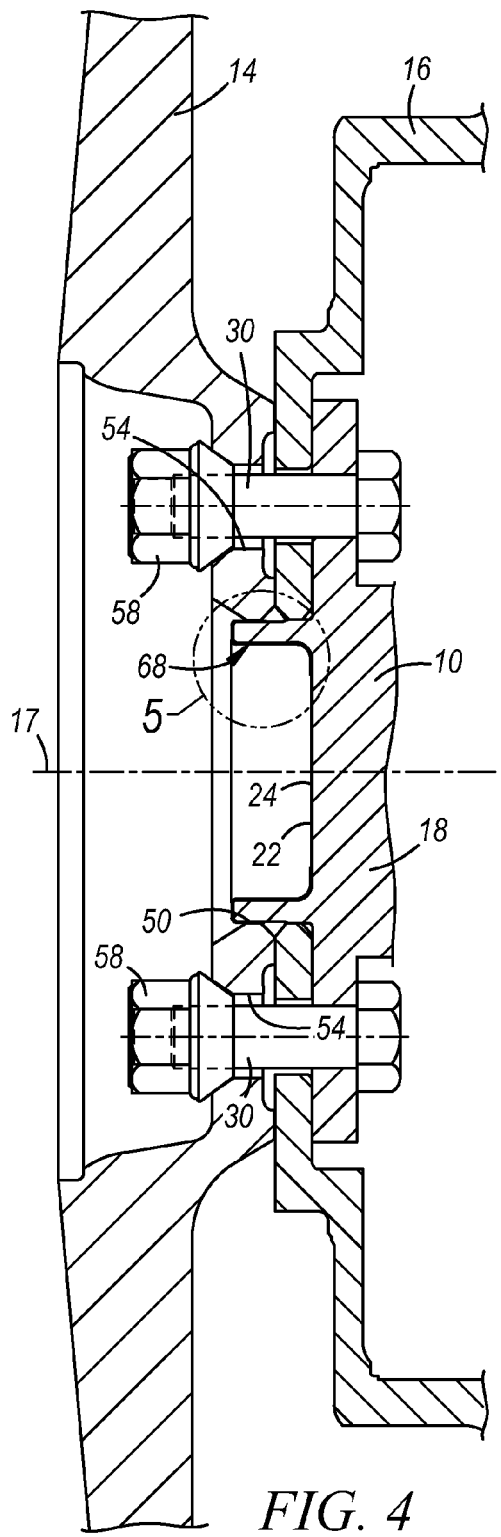
FIG. 4 is a view similar to FIG. 1 but showing the wheel mounted on the hub.

The vehicle wheel 14 has a central opening 50 that fits over the circular outer surface 20 of the hub 10. The central opening 50 is defined by a circular wall 52 having a diameter DW that is larger than the diameter DH of the circular outer surface 20 of hub 10. The difference between the diameters DH of the circular outer surface 20 of hub 10 and the diameter DW of the central opening 50 of the wheel 14 provides an annular clearance space S. The vehicle wheel 14 has a plurality of bolt holes 54 so that the vehicle wheel 14 can fit over the threaded studs 38. After the vehicle wheel 14 is installed onto the threaded studs 38, lug nuts 58 are installed on the threaded studs 38 to hold both the wheel 14 and the brake rotor 16 on the hub 10. In particular, as seen in FIG. 4, the tightening of the lug nuts 58 will force the wheel 14 against the brake rotor 16 and force brake rotor 16 against the hub flange 22 of the hub 10. The lug nuts 58 preferably have a conical face 60 that fits within a conical recess 62 of the wheel 14.

Figure 2:
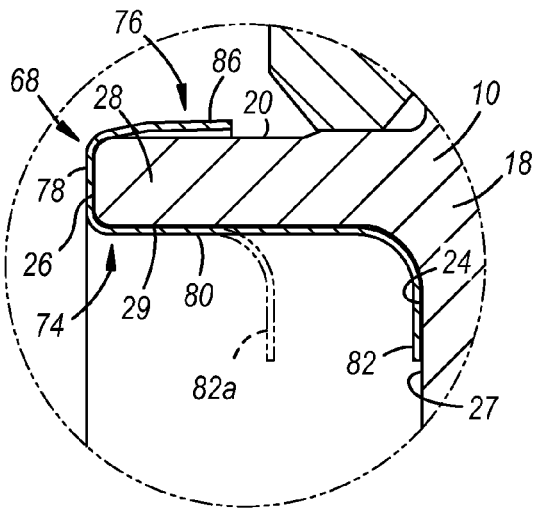
FIG. 2 is an enlarged fragment of a portion of FIG. 1.
Figure 3:
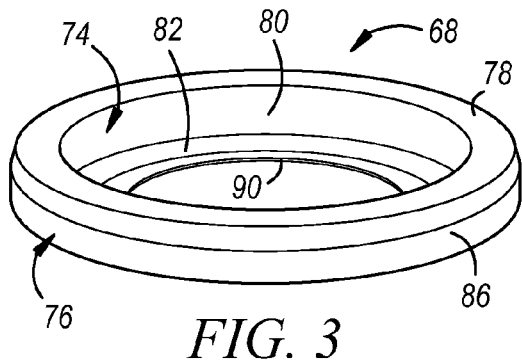
FIG. 3 is a perspective view of the annular centering ring of this invention.

As seen in FIG. 1, an annular centering ring, generally indicated at 68, is provided on the hub 10 for centering the wheel 14 on the hub 10. Referring now to FIGS. 2 and 3, it is seen that the annular centering ring 68 includes an annular mounting flange structure, generally indicated at 74, for seating upon the axial projecting rim structure 28 of the hub 10, and a centering skirt structure 76 that is integral with and extends from the mounting flange structure 74. The annular centering ring 68 is of plastic construction. In particular, the annular mounting flange structure 74 includes an end wall 78 that seats against the outer end face 26 of hub 10, an inner wall 80 that extends along the cavity inner side wall 29, and a stiffening wall 82 that extends radially toward the centerline 17 of the hub 10. The centering skirt structure 76, which is molded integrally with the mounting flange structure 74, includes a flexible skirt wall 86 that is angled radially outward to extend in spaced relation from the circular outer surface 20 of the hub 10, as seen in FIG. 2.

FIG. 2 shows the annular centering ring 68 installed upon the end of the hub shaft 18. During the installation, the outward angling of the flexible skirt wall 86 will act as a chamfer to ease the installation of the annular centering ring 68 onto the hub shaft 18. In particular, because the flexible skirt wall 86 is angled radially outward, it will not engage with the circular outer surface 20 of the hub 10 during the installation, thereby avoiding friction or interference that would render installation more difficult. The inner wall 80 of the annular centering ring 68 overlies and seats against the cavity side wall 29. The stiffening wall 82 projects from the inner wall 80 toward the centerline 17 of the hub 10 and functions to stiffen the inner wall 80 and force the inner wall 80 against the cavity inner side wall 29 so as to assure that the centering ring 68, once installed upon the hub shaft 18 shown in FIG. 2, will be retained thereon for shipping and handling. FIG. 2 also shows that the skirt wall 86 of the skirt structure 76 is overlying the circular outer surface 20 of hub 10 but is spaced somewhat therefrom.

Figure 5:
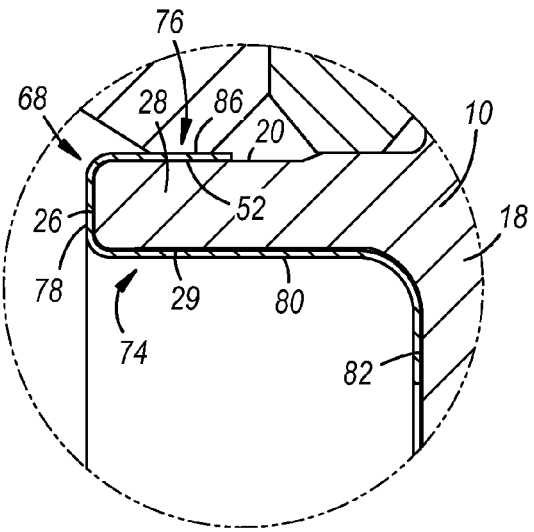
FIG. 5 is an enlarged fragment of a portion of FIG. 4.

Referring to FIGS. 4 and 5, the wheel 14 has been installed upon hub shaft 18 and it is seen that the circular wall 52 of the wheel central opening 50 has come into engagement with the skirt structure 76 of the annular centering ring 68 causing the wheel 14 to become centered on the outer surface 20 of the hub shaft 18 as the skirt wall 86 flexes inwardly toward the center line 17 of the hub 10. The relationship between the diameter DH of the circular outer surface 20, and the diameter DW of the circular wall 52 of the wheel 14, and the thickness of the skirt wall 86 of the centering ring 68, is such that the skirt wall 86 will be captured in a press-fit relationship between the circular outer surface 20 of the hub shaft 18 and the circular wall 52 of the wheel 14. In achieving the press-fit relationship, the thickness of the skirt wall 86 can be compressed. In addition, or in the alternative, to the extent that the thickness of the skirt wall 86 exceeds the space S between the circular outer surface 20 of the hub shaft 18 and the circular wall 52 of the wheel 14, the excess thickness of the skirt wall 86 will be extruded away by the force of the oncoming circular wall 52 of the wheel 14 during the installation of the wheel 14. This extruding away can be in the nature of the excess thickness being pushed and displaced forward as permitted by the plasticity of the plastic material from which the annular centering ring 68 is constructed. Or, some or all of the excess thickness can actually be shaved away during the installation of the wheel 14. The result of this action by the annular centering ring 58 is that the annular centering ring 68 will have functioned to precisely locate and center the wheel 14 upon the hub 10. Thus, upon tightening of the lug nuts 36, the wheel 14 will have been precisely centered upon the hub 10, thereby eliminating eccentricity problems that would result in ride and handling problems. The uniform and accurate thickness of the skirt wall 86 will facilitate the function of the annular centering ring 68, and, therefore, it is preferable that the annular centering ring 68 be manufactured by vacuum forming of the annular centering ring 68 from a plastic sheet material of uniform and accurate thickness.

Thus, it will be appreciated that the foregoing combination of a cavity provided in the end wall of the hub, with the particular structure of the centering ring disclosed herein, will enable the precise centering of the vehicle wheel 14 on the hub 18 without requiring any supplementary machine or machining of either the wheel 14 or the hub shaft 18. Accordingly, the unique annular centering ring 86 of this invention achieves economy of manufacture and avoidance of vehicle ride and handling problems.

In FIG. 3, the stiffening wall 82 is shown as engaging with the bottom wall 27 of the cavity. However, it will be understood that the stiffening wall 82 can be located at any location along the cavity inner side wall 29, for example at the phantom line indicated position 82a shown in FIG. 2. In addition, as best seen in FIG. 3 of the drawings, the stiffening wall 82 can have a central void 90. As an alternative, however, it will be understood that the stiffening wall 82 can be continuous across the annular centering ring 68 and accordingly will extend continuously between cavity inner side wall 29.

Figure 6:
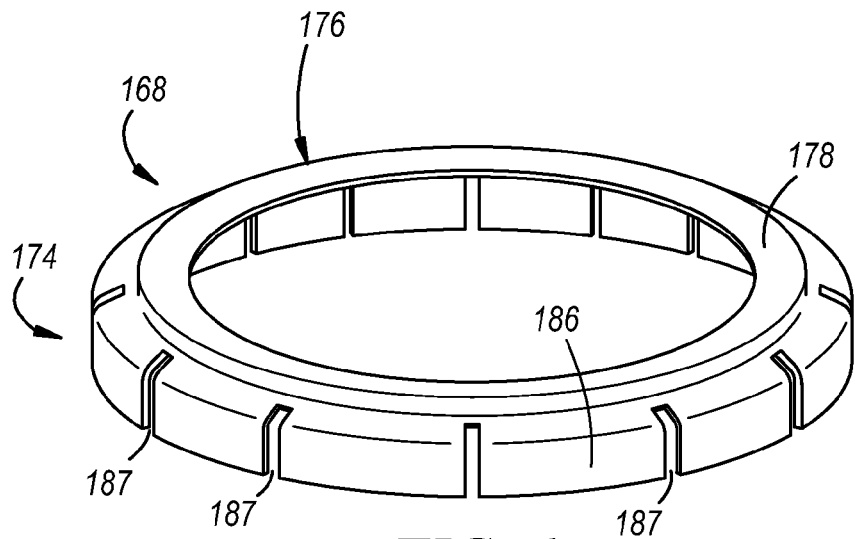
FIG. 6 is a view similar to FIG. 3 but showing another embodiment of the annular centering ring of this invention.
Figure 7:
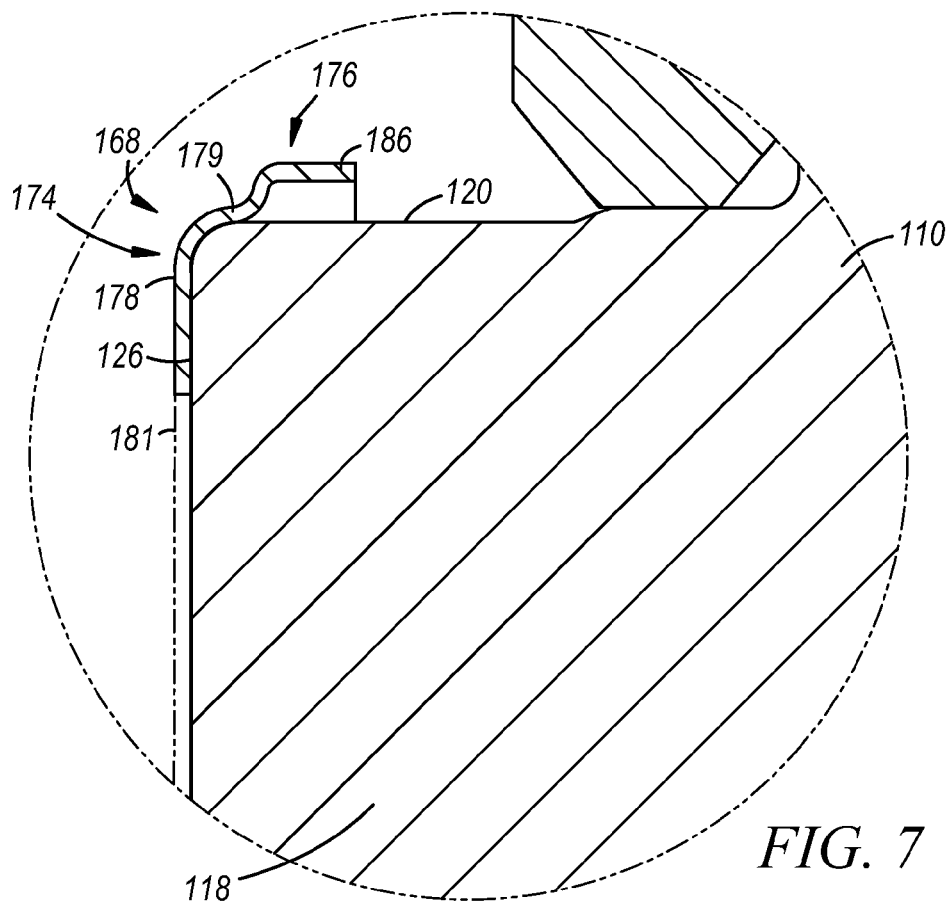
FIG. 7 is a view similar to FIG. 2 showing the annular centering ring of FIG. 6 as installed on a wheel hub of the vehicle.

In the embodiment of the invention shown in FIGS. 1-5, the annular centering ring 68 takes advantage of the cavity 24 that is provided in the end of the hub 10. In some cases, however, the hub of a vehicle will not have a cavity 24. FIGS. 6 and 7 show another embodiment of the invention where an annular centering ring 168 is installed upon a hub 110 that does not have a cavity. In particular as seen in FIG. 7, the hub 110 has an end wall 126 that has no cavity therein. The annular centering ring 168 includes a mounting portion 174 and a flexible skirt structure 176. The mounting structure 174 includes an end wall portion 178 that overlies and engages with the end wall 126, and a lip structure 179 that is integral with the end wall 178 and extends a 90° angle therefrom in order to overlie the outer surface 120 of the hub shaft 118. Thus, the end wall portion 178 and the lip structure 179 will cooperate to effectively retain the annular centering ring 168 on the end of the hub shaft 118. The skirt structure 176 includes a skirt wall 186 that is angled or flared outwardly from the lip structure 179 so that the skirt wall 186 will be spaced away from the outer surface 120 during the installation, thereby avoiding any interference or friction that would inhibit the installation of the annular centering ring 168 on the end of the hub shaft 118.

It will be appreciated that during the installation of the wheel 14, the skirt wall 186 will be forced inwardly and thereby function in the same manner as the skirt wall 86 as described herein before in relation to the embodiment of FIGS. 1-5. Furthermore, as seen in FIG. 6, the annular centering ring 168 can have a plurality of relief slots 187 that are provided at spaced intervals along the circumference of the skirt wall 186. These relief slots 187 will facilitate the inward radial movement of the skirt 186 during the installation of the wheel 14. In addition, these relief slots 187 will function to drain away water that might infiltrate between the wheel 14 and the hub 10 during use of the vehicle. As in the case of the embodiment of FIGS. 1 to 5, the skirt 186 will be captured in a press-fit relation and/or be extruded during the installation of the wheel so as to obtain proper and reliable centering of the wheel on the hub 110. If desired, the end wall portion 178 of the mounting structure 174 can extend all the way across the end wall 126, as indicated by the reference numeral 181 of FIG. 7.

What is claimed is:

1. The combination comprising:
   a vehicle hub having a circular outer surface and an outer end face, the outer end face of the hub having a cavity therein and the cavity having a cavity inner side wall;
   a vehicle wheel having a central opening defined by a circular wall, the central opening being of larger diameter than the diameter of the circular outer surface of the hub to define an annular space between the hub and the wheel;
   and an annular centering ring of flexible plastic for installation upon the hub to center the wheel on the hub, said annular centering ring having an annular mounting flange structure that seats upon the hub to retain the annular centering ring on the hub in readiness for the installation of the wheel on the hub, and a centering skirt structure extending integrally from the mounting flange structure at an outward angle so that the centering skirt structure is radially spaced from the circular outer surface of the hub, said annular mounting flange structure including an end wall that engages with the outer end face of the hub and an inner side wall that extends along the cavity inner side wall of the cavity, said centering skirt structure being engaged by the circular wall of the wheel when the wheel is installed onto the hub so that the centering skirt structure is flexed radially inward and is press-fit within the annular space between the circular outer surface of the hub and the central opening of the wheel to thereby center the wheel upon the hub in readiness for installation of a plurality of lug nuts.

2. The combination of claim 1 further comprising the annular mounting flange structure including an end wall that engages with the outer end face of the hub, and a rim structure that extends part way onto the circular outer surface of the hub to thereby retain the annular centering ring on the hub.

3. The combination of claim 1 further comprising the centering skirt structure including a skirt wall that extends along the outer surface of the hub but in spaced relation therefrom until engaged by the circular wall defining the central opening of the wheel.

4. The combination of claim 3 further comprising the skirt wall having a wall thickness that exceeds the size of the annular space between the hub and the wheel so that the skirt wall is press-fit between the hub and the wheel.

5. The combination of claim 3 further comprising the skirt wall having a wall thickness that exceeds the size of the annular space between the hub and the wheel so that the wall thickness of the skirt wall is extruded during the installation of the wheel on the hub.

6. The combination of claim 3 further comprising the skirt wall having relief slots therein at spaced intervals around the circumference of the skirt wall.

7. The combination comprising:
a vehicle hub having a circular outer surface and an outer end face having a central cavity therein defining a rim structure and having a cavity inner side wall;
a vehicle wheel having a central opening defined by a circular wall, the central opening being of larger diameter than the diameter of the circular outer surface of the hub to define an annular space between the hub and the wheel;
and an annular centering ring of flexible plastic for installation upon the hub to center the wheel on the hub, said annular centering ring having an annular mounting flange structure that seats upon the rim structure of the hub to retain the annular centering ring on the hub in readiness for the installation of the wheel on the hub, the annular mounting flange structure including an end wall that engages with the outer end face of the hub, an inner side wall that extends along the cavity inner side wall of the cavity, and a stiffening wall that extends radially from the side wall to force the inner side wall into engagement with the cavity inner side wall of the hub and a centering skirt structure extending from the mounting flange structure and overlying the circular outer surface of the hub, said centering skirt structure being engaged by the circular wall of the wheel when the wheel is installed onto the hub so that the centering skirt structure is flexed and occupies the annular space between the circular outer surface of the hub and the central opening of the wheel to thereby center the wheel upon the hub in readiness for installation of a plurality of lug nuts.

8. The combination of claim 7 further comprising the stiffening wall engaging a bottom wall of the cavity.

9. The combination of claim 8 further comprising the stiffening wall being spaced away from a bottom wall of the cavity.

10. The combination of claim 8 further comprising the stiffening wall being continuous and extending uninterrupted between the cavity inner side wall.

11. The combination of claim 8 further comprising the stiffening wall extending only part way between the cavity inner side wall and having a central void therein.

12. The combination of claim 7 further comprising the centering skirt structure including a skirt wall that extends along the outer surface of the hub but in spaced relation therefrom until engaged by the circular wall defining the central opening of the wheel.

13. The combination of claim 12 further comprising the skirt wall having a wall thickness that exceeds the size of the annular space between the hub and the wheel so that the skirt wall is press-fit between the hub and the wheel.

14. The combination of claim 13 further comprising the skirt wall having relief slots therein at spaced intervals around the circumference of the skirt wall.

15. The combination of claim 12 further comprising the skirt wall having a wall thickness that exceeds the size of the annular space between the hub and the wheel so that the wall thickness of the skirt wall is extruded during the installation of the wheel on the hub.

16. The combination comprising:
a vehicle hub having a circular outer surface and an outer end face;
a vehicle wheel having a central opening defined by a circular wall, the central opening being of larger diameter than the diameter of the circular outer surface of the hub to define an annular space between the hub and the wheel;
and an annular centering ring of flexible plastic for installation upon the hub to center the wheel on the hub, said annular centering ring having an end wall that engages with the outer end face of the hub and a lip structure that extends part way onto the circular outer surface of the hub, said end wall and said lip structure cooperating to retain the annular centering ring on the hub in readiness for the installation of the wheel on the hub, and a skirt wall that extends integrally from the lip structure to lie along the circular outer surface of the hub but in spaced relation therefrom until engaged by the central opening of the wheel. said skirt wall being engaged by the circular wall of the wheel when the wheel is installed onto the hub so that the skirt wall is flexed and occupies the annular space between the circular outer surface of the hub and the central opening of the wheel in press-fit therebetween to thereby center the wheel upon the hub in readiness for installation of a plurality of lug nuts.

17. The combination of claim 16 further comprising the skirt wall having a wall thickness that exceeds the size of the annular space between the hub and the wheel so that the wall thickness of the skirt wall is extruded during the installation of the wheel on the hub.

18. The combination of claim 17 further comprising the skirt wall having relief slots therein at spaced intervals around the circumference of the skirt wall.

* * * * *